US010438395B2

(12) United States Patent
Kim et al.

(10) Patent No.: US 10,438,395 B2
(45) Date of Patent: Oct. 8, 2019

(54) APPARATUS, METHOD AND COMPUTER PROGRAM FOR DISPLAYING CARTOON CONTENT

(71) Applicant: NAVER CORPORATION, Seongnam-si (KR)

(72) Inventors: Hyo Kim, Seongnam-si (KR); Hyun Chul Lee, Seongnam-si (KR); Ji Han Kim, Seongnam-si (KR); Dai Hyun Lim, Seongnam-si (KR); Byoung Kwan Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 0 days.

(21) Appl. No.: 15/921,280

(22) Filed: Mar. 14, 2018

(65) Prior Publication Data

US 2018/0204371 A1 Jul. 19, 2018

Related U.S. Application Data

(63) Continuation-in-part of application No. 15/046,746, filed on Feb. 18, 2016, now abandoned.

(30) Foreign Application Priority Data

Mar. 25, 2015 (KR) ........................ 10-2015-0041597

(51) Int. Cl.
*G06T 13/80* (2011.01)
*H04L 29/08* (2006.01)

(52) U.S. Cl.
CPC ............. *G06T 13/80* (2013.01); *H04L 67/06* (2013.01); *H04L 67/2847* (2013.01); *H04L 67/12* (2013.01)

(58) Field of Classification Search
None
See application file for complete search history.

(56) References Cited

U.S. PATENT DOCUMENTS

| 6,313,838 | B1 * | 11/2001 | Deering | ................. G06T 15/00 345/420 |
| 8,497,883 | B2 | 7/2013 | Ito | |
| 8,839,330 | B2 | 9/2014 | Goto et al. | |

(Continued)

FOREIGN PATENT DOCUMENTS

| CN | 101123607 A | 2/2008 |
| JP | 2008193535 A | 8/2008 |

(Continued)

OTHER PUBLICATIONS

Office Action issued in corresponding Korean Patent App. No. 10-2015-0041597, dated Feb. 3, 2015.

(Continued)

*Primary Examiner* — Saptarshi Mazumder
(74) *Attorney, Agent, or Firm* — Greer Burns & Crain, Ltd.

(57) ABSTRACT

An apparatus for displaying cartoon content includes a display unit configured to display a display region of the cartoon content; a display region variation determining unit configured to determine data variation in the display region; a preloading controller configured to determine a download speed based on the data variation; and a preloading performing unit configured to download data corresponding to a preparation region different from the display region at the download speed.

19 Claims, 9 Drawing Sheets

(56) References Cited

U.S. PATENT DOCUMENTS

| | | | |
|---|---|---|---|
| 9,584,787 B1* | 2/2017 | Belovay | H04N 9/8042 |
| 2003/0045334 A1* | 3/2003 | Hosokawa | A63F 13/10 |
| | | | 463/6 |
| 2007/0057966 A1 | 3/2007 | Ohno et al. | |
| 2013/0325343 A1* | 12/2013 | Blumenberg | G01C 21/00 |
| | | | 701/533 |
| 2014/0214578 A1* | 7/2014 | Kirkpatrick | G06Q 30/0601 |
| | | | 705/26.1 |
| 2015/0054766 A1 | 2/2015 | Ishida | |
| 2015/0121255 A1* | 4/2015 | Lee | G06Q 10/10 |
| | | | 715/758 |

FOREIGN PATENT DOCUMENTS

| | | |
|---|---|---|
| JP | 2010003092 A | 1/2010 |
| JP | 2010205252 A | 9/2010 |
| JP | 2012212318 A | 11/2012 |
| JP | 2015043120 A | 3/2015 |
| JP | 2015043165 A | 3/2015 |
| WO | 2010024102 A1 | 3/2010 |

OTHER PUBLICATIONS

Office Action of the Taiwanese Patent App. No. 105108728, dated Jul. 1, 2016.
Office Action issued in corresponding Japanese Patent App. No. 2016-005520, dated Jan. 17, 2017.

* cited by examiner

APPARATUS, METHOD AND COMPUTER PROGRAM FOR DISPLAYING CARTOON CONTENT

CROSS-REFERENCE TO RELATED APPLICATIONS

This is a continuation-in-part of U.S. application Ser. No. 15/046,746 filed Feb. 18, 2016, which claims the benefit of Korean Patent Application No. 10-2015-0041597, filed on Mar. 25, 2015, in the Korean Intellectual Property Office, the disclosure of which is incorporated herein in its entirety by reference.

BACKGROUND

1. Field

One or more exemplary embodiments of the present invention relate to an apparatus, a method, and a computer program for displaying cartoon content, and more particularly, to an apparatus, a method, and a computer program for displaying cartoon content that determine a preloading speed based on variations of a display region.

2. Description of the Related Art

A cartoon is a picture intended to satirize or criticize life or society by exaggerating or omitting the features of an object and using humor, caricature, social commentary, etc. Cartoons may be classified into various types, e.g., a romance cartoon, a martial arts cartoon, an action cartoon, a comic cartoon, a sports cartoon, a science fiction (SF) cartoon, etc., according to the contents thereof. A cartoon may show complex human attitudes using a visual system of pictures (images) and characters (text) and is thus more effective in attracting the attention of readers than a general book containing only characters.

Recently, with advancements in communication technology, cartoons have been provided not only through comic books but also via the Internet or the like.

SUMMARY

One or more exemplary embodiments of the present invention provide an apparatus, a method, and a computer program for displaying cartoon content more seamlessly by distributing a computation amount required to display the cartoon content.

One or more exemplary embodiments provide an apparatus, a method, and a computer program for displaying cartoon content, thereby displaying operations more seamlessly by reducing a speed for preloading the carton content in a case where an animation operation or an operation according to a user effect is performed.

One or more exemplary embodiments provide an apparatus, a method, and a computer program for displaying cartoon content, thereby more naturally displaying a screen in accordance with a user reading habit by correcting a speed for preloading the cartoon content based on a user event learning value.

Additional aspects will be set forth in part in the description which follows and, in part, will be apparent from the description, or may be learned by practice of the presented embodiments.

According to one or more exemplary embodiments, there is a non-transitory computer-readable recording medium having recorded thereon a computer program for performing the method for displaying cartoon content described above.

According to one or more exemplary embodiments, there is a distribution server that distributes a program for executing the method for displaying cartoon content by a computer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
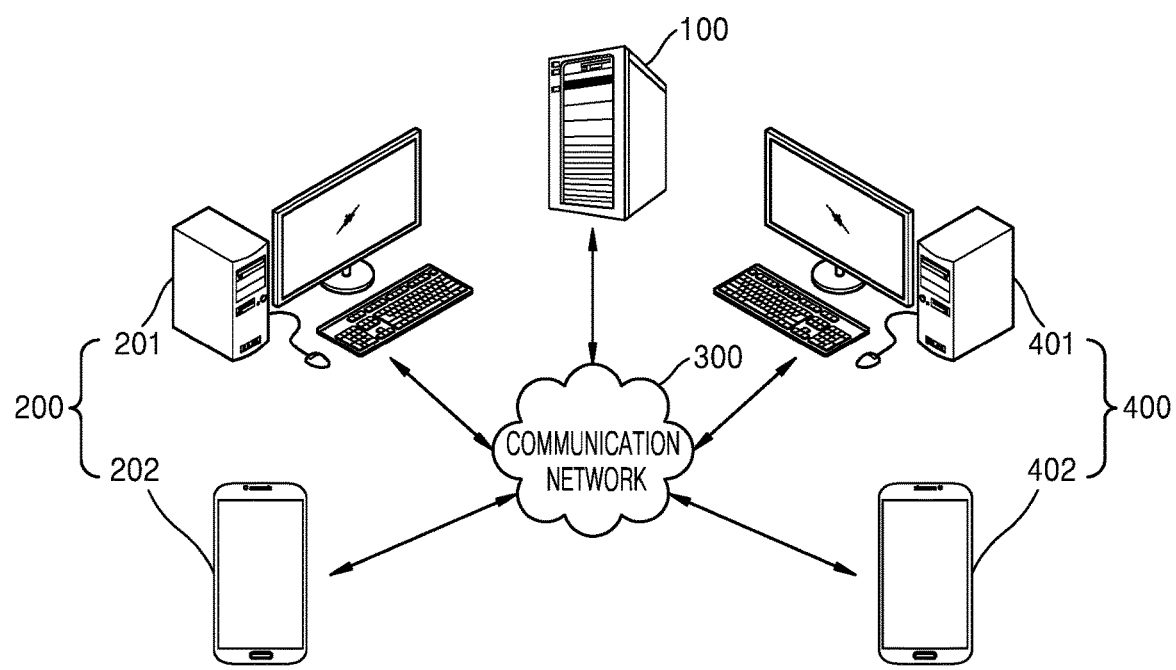
FIG. 1 is a diagram of a configuration of a cartoon content providing system according to an exemplary embodiment.

Reference will now be made in detail to embodiments, examples of which are illustrated in the accompanying drawings. In this regard, the present embodiments may have different forms and should not be construed as being limited to the descriptions set forth herein. Accordingly, the exemplary embodiments are merely described below, by referring to the figures, to explain aspects of the present description. It will be understood that although the terms "first", "second", etc. may be used herein to describe various components, these components should not be limited by these terms. These components are only used to distinguish one component from another. As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Sizes of elements in the drawings may be exaggerated for convenience of explanation. In other words, since sizes and thicknesses of components in the drawings are arbitrarily illustrated for convenience of explanation, the following embodiments are not limited thereto. As used herein, the term "and/or" includes any and all combinations of one or more of the associated listed items.

The term 'cartoon content' may mean data created by a cartoon content creator and a cartoonist. A piece of the cartoon content may be configured to include at least one page. In this regard, the term 'page' may be an image file or a text file and correspond to a unit of cartoon content loaded in a cartoon content display apparatus. One page may be configured to include one or more cuts. In this regard, the term 'cut' may mean data containing one scene and may include at least one layer including an image or text. A plurality of cuts can be placed or listed continuously on one page. The term "cartoon content" is used herein to illustrate that the subject matter of the content to which the present invention is applied can be cartoon. Thus, the application of the technical features described herein is not limited to "cartoon" file. The embodiments of the present invention can be applied regardless of the field if the content includes a plurality of cuts as described above.

The term 'display region' is a region of the cartoon content that is displayed to a user through a display unit. The cartoon content may correspond to and move according to user events. The display region may be changed according to the movement of the cartoon content, and accordingly the displayed cartoon content may also be changed.

The term 'effect' indicates an animation operation that is contained in the whole of the cartoon content or a part thereof and is contained in a layer or a cut. In more detail, the effect includes a movement of a layer, division, going down, going up, expansion, a slow movement, a fast movement, an operation causing a color change, a perspective effect of a cut, a movement of a time difference, rotation, transparent processing, rescaling, and setting a clipping region, but is not limited thereto. A different type of effect may be included. The animation operation may be displayed only on a page including a layer to which an effect is applied. For example, a second page is continuously positioned at a lower end of a first page, and, if a specific layer included in the first page to which movement animation is applied moves in a lower direction and goes beyond a first page region, the layer included in the first page may not be displayed on a second page region.

A cut or a layer may include property information. The property information of the cut or the layer may include location information, layer information, or other effect information.

In more detail, location information is information relating to a layer or a cut such as the movement of the time difference and indicates a location that displays the layer or the cut in which the effect is set. The location information may designate an inner or outer location that displays the cut as a pixel value or a percent value. For example, in the case of a first cut including a first layer, initial and final locations of the first layer may be set as locations in the first cut.

Layer information is information regarding the display sequence of a plurality of layers including the cut or the layer and may be set as sequentially increasing or decreasing numbers from a layer that is to be displayed uppermost of the layers to a layer that is to be displayed lowermost of the layers. A plurality of layers included in one cut or layer may be displayed according to the set layer information. In a case where an upper layer and a lower layer are partially overlapped, only the upper layer may be displayed.

Other effect information may include movement information, speed information, music information, vibration information, color information, an effect display start time, etc. For example, effect information may include information regarding an initial location, a final location, a start time, or an end time of the layer or the cut or a color change time or point, a first color that is initial color information, and a second color that is color information changed from the first color. Effect information may include a movement speed such as 2 times, 3 times, ½ times, and ⅓ times of speed corresponding to a user event.

Hereinafter, one or more exemplary embodiments will be described in detail with reference to accompanying drawings. In drawings, like reference numerals refer to like elements throughout and overlapping descriptions will not be repeated.

FIG. 1 is a diagram of a cartoon content providing system 10 according to an exemplary embodiment.

Referring to FIG. 1, the cartoon content providing system 10 according to the exemplary embodiments includes a cartoon content server 100, a cartoon content display apparatus 200, a communication network 300, and a cartoon content generation apparatus 400.

The cartoon content server 100 provides cartoon content or cartoon content display means to the carton content display apparatus 200. The cartoon content server 100 may provide the cartoon content classified according to authors, episodes, works, and days and may provide works of which publishing has been finished. The cartoon content server 100 may selectively provide the cartoon content according to a request from the carton content display apparatus 200. The cartoon content server 100 may transmit the cartoon content to the carton content display apparatus 200 in an application form over the communication network 300. The cartoon content server 100 may receive and store cartoon content generated by the cartoon content generation apparatus 400.

The cartoon content display apparatus 200 may be an apparatus that displays the cartoon content downloaded from the cartoon content server 100 or stored cartoon content in correspondence with a user event. The cartoon content display apparatus 200 may download the cartoon content by changing a data download speed of a next screen according to a variation of a screen displayed through a display unit of the carton content display apparatus 200. In this regard, in a case where an animation operation included in the screen, a movement of the screen according to the user event, or a zooming in/out operation of the screen is present, the cartoon content display apparatus 200 may reduce a cartoon content download speed, thereby more seamlessly displaying an animation or user event operation. Download speed may correspond to amount of data downloaded from the cartoon content server 100 to the cartoon content display apparatus per unit of time. For example, bps (bit per second), Mbps (Mega bit per second) or MB/s (Mega byte per second), etc. may be used as a unit of the download speed, but the present invention is not limited thereto.

The cartoon content display apparatus 200 may be communication terminals using a web service in a wired/wireless communication environment. In this regard, the cartoon content display apparatus 200 may be a personal computer 201 of the user or a mobile terminal 202 of the user. The mobile terminal 202 is illustrated as a smart phone in FIG. 1 but the exemplary embodiments are not limited thereto. As described above, a terminal having an application capable of web browsing embedded therein may be employed without limitation.

In more detail, the cartoon content display apparatus 200 may include a computer (e.g., a desktop computer, a laptop computer, a tablet PC, etc.), a media computing platform (e.g., a cable, a satellite set-top box, a digital video recorder, etc.), a handheld computing device (e.g., a PDA, an email client, etc.), any type of a mobile phone, or other types of computing or communication platforms, but the exemplary embodiments are not limited thereto.

The communication network 300 connects the plurality of cartoon content display apparatuses 200 and the cartoon content server 100. That is, the communication network 300 may provide connection paths for transmitting and receiving data between the cartoon content display apparatuses 200 and the cartoon content server 100 after the cartoon content display apparatuses 200 access the cartoon content server 100. The communication network 300 may include, for example, wired networks such as local-area networks (LANs), wide-area networks (WANs), metropolitan area networks (MANs), integrated service digital networks (IS- DNs), etc. or wireless networks such as wireless LANs, CDMA, Bluetooth, satellite network, etc., but the exemplary embodiments are not limited thereto.

The cartoon content generation apparatus 400 provides means for generating the cartoon content to a cartoon content creator (for example, a cartoonist). The cartoon content generation apparatus 400 may provide a user interface for conveniently generating 2D cartoon content. The cartoon content generation apparatus 400 may provide a function of generating one or more pages included in the cartoon content, a function of generating one or more cuts included in the pages, a function of generating one or more layers included in the cuts, or an effect input function of applying an effect to the layers. The cartoon content generation apparatus 400 may provide a function of appropriately adjusting an effect application range or dividing a page in order to subdivide a cartoon content loading unit. In this regard, the cartoon content generation apparatus 400 may divide one page into at least two pages and generate the divided pages.

The cartoon content generation apparatuses 400 may be communication terminals using a web service in a wired/wireless communication environment. In this regard, the cartoon content generation apparatus 400 may be a personal computer 401 of the user (i.e., a cartoon content creator) or a mobile terminal 402 of the user. The mobile terminal 402 is illustrated as a smart phone in FIG. 1 but the exemplary embodiments are not limited thereto. As described above, a terminal having an application capable of web browsing embedded therein may be employed without limitation.

In more detail, the cartoon content generation apparatus 400 may include a computer (e.g., a desktop computer, a laptop computer, a tablet PC, etc.), a media computing platform (e.g., a cable, a satellite set-top box, a digital video recorder, etc.), a handheld computing device (e.g., a PDA, an email client, etc.), any type of a mobile phone, or other types of computing or communication platforms, but the exemplary embodiments are not limited thereto.

The cartoon content display apparatus 200 according to the exemplary embodiments may determine a download speed based on a data variation of a display region displayed on a screen and download data corresponding to a preparation region at the determined download speed. Accordingly, the cartoon content display apparatus 200 according to the exemplary embodiments may change a cartoon content preload speed according to the data variation of the screen, thereby more seamlessly displaying an animation or user event operation.

Figure 2:
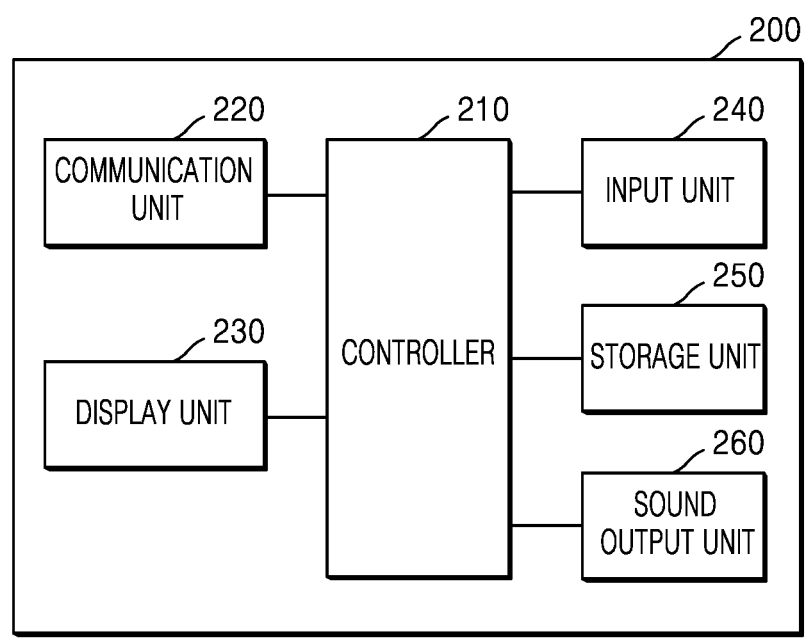
FIG. 2 is a block diagram of an example of the internal configuration of the cartoon content display apparatus of FIG. 1.

FIG. 2 is a block diagram of an example of the internal configuration of the cartoon content display apparatus 200 of FIG. 1.

Referring to FIG. 2, the cartoon content display apparatus 200 includes a controller 210, a communication unit 220, a display unit 230, an input unit 240, a storage unit 250, and a sound output unit 260.

The controller 210 controls display of cartoon content through the display unit 230. The controller 210 also controls preloading and appropriately displaying pages generated by the cartoon content generation apparatus 400.

In alternative exemplary embodiments, the controller 210 may determine a download speed based on the data variation of a display region and download data corresponding to a preparation region at the determined download speed.

In more detail, the controller 210 may calculate the data variation of the screen according to an animation operation included in the display region or the moving speed of the screen, a zooming in/out speed of the screen, determine the download speed based on the data variation of the screen, and preload the preparation region (a non-display region) of cartoon content, excluding the display (current) region and a previously displayed region, at the download speed.

The controller 210 is a type of a central processing unit (CPU), and controls the process of displaying a display region of the cartoon content, determining data variation in the display region, determining a download speed, downloading data. In other words, the controller 210 provides various function units, such as a display region variation determining unit 211, a user event learning unit 212, a preloading controller 213, and a preloading performing unit 214.

The controller 210 may include various types of apparatuses capable of processing data, such as a processor. Here, the 'processor' may be, for example, a data processing apparatus included in hardware, and may perform a function expressed in a code or a command included in a program. Examples of the data processing apparatus included in hardware may include a microprocessor, a CPU, a processor core, a multiprocessor, an application-specific integrated circuit (ASIC), and a field programmable gate array (FPGA), but are not limited thereto.

The communication unit 220 includes one or more components that enable communication between the cartoon content display apparatus 200 and the cartoon content server 100. For example, the communication unit 220 may include a short-distance wireless communication unit or a mobile communication unit. Examples of the short-range wireless communication unit may include, but are not limited to, a Bluetooth communication unit, a Bluetooth low energy (BLE) communication unit, a near-field communication unit, a WLAN (Wi-Fi) communication unit, a Zigbee communication unit, an infrared data association (IrDA) communication unit, a Wi-Fi direct (WFD) communication unit, a ultra-wideband (UWB) communication unit, an Ant+ communication unit, etc. The mobile communication unit may exchange a radio signal with at least one among a base station, an external terminal, and a server in a mobile communication network. The radio signal may include a voice call signal, a video communication call signal, or various types of data via transmission and reception of text/multimedia messages. The communication unit 220 may communicate with the cartoon content server 100 to obtain the cartoon content or an application for displaying the cartoon content from the cartoon content server 100.

The display unit 230 may display cartoon content including the pages generated by the cartoon content generation apparatus 400. The display unit 230 may display the cartoon content by moving the cartoon content in correspondence with the user event with respect to the cartoon content. The display unit 230 may display the cartoon content by moving the cartoon content according to the moving speed and distance in consideration of the user event and the property information of the cartoon content. Meanwhile, when the display unit 230 is configured with a touch screen in which a touch pad forms a layer structure, the display unit 230 may be used as an input device in addition to an output device. The display unit 230 may include at least one of a liquid crystal display (LCD), a thin film transistor-liquid crystal display (TFT-LCD), an organic light-emitting diode (OLED) display, a flexible display, a 3D display, and an electrophoretic display.

The input unit 240 is a means used by a user to input data for controlling the cartoon content display apparatus 200. For example, the input unit 240 may include a key pad, a dome switch, a touch pad (of a contact capacitive type, a press resistive type, an infrared sensing type, a surface ultrasonic conductive type, an integration tension measurement type, or a piezo effect type), a jog wheel, a jog switch, etc. but is not limited thereto. The input unit 240 may include an imaging device that acquires a binocular image of a user in order to determine whether the user's eyes stay on the screen.

The storage unit 250 stores the cartoon content obtained through the communication unit 220.

The sound output unit 260 outputs audio data received from the communication unit 220 or stored in storage unit 250. The sound output unit 260 may output sound signals relating to effect sound and background sound included in the cartoon content. The sound output unit 260 may include a speaker, a buzzer, etc.

The sound output unit 260 may further include a vibration motor (not shown). The vibration motor may output a vibration signal. For example, the vibration motor may output the vibration signal corresponding to the output of audio data or image data (for example, the effect sound and the background sound included in the cartoon content). The vibration motor may also output the vibration signal when a touch is input to the touch screen.

Figure 3:
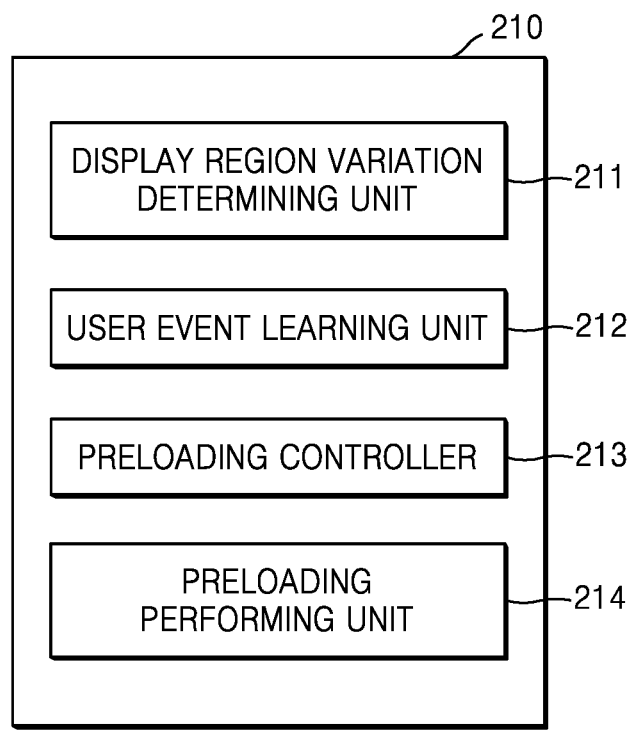
FIG. 3 is a block diagram of an example of the controller of FIG. 2.

FIG. 3 is a block diagram of an exemplary embodiment of the controller 210 of FIG. 2.

Referring to FIG. 3, the controller 210 includes a display region variation determining unit 211, a user event learning unit 212, a preloading controller 213, and a preloading performing unit 214.

The display region variation determining unit 211 determines the data variation of a display region displayed on a screen.

The display region variation determining unit 211 determines the data variation in consideration of an animation operation included in the display region. The display region variation determining unit 211 may determine that the data variation is large as a large amount of computation is required for the animation operation. For example, in a second case where a larger amount of computation is required when operations of moving and rotating a layer are present on the screen than a first case where only an operation of moving the layer is present on the screen, the display region variation determining unit 211 may determine that the second case has a larger data variation than the first case.

In another embodiment, the display region variation determining unit 211 may determine the data variation based on a change in the display region by a user event. The display region variation determining unit 211 may determine that the data variation increases as a moving speed of the display region and zooming in/out speed of the screen increases.

The user event learning unit 212 collects user event history and calculates a user event learning value including an average reading speed of a user, an average reading speed of all users, an average reading speed of specific cartoon content.

The user event learning unit 212 may calculate the average reading speed in consideration of time for which user's eyes stay on the screen. For example, in a case where 2 cuts and 50 words are displayed on the display region and specific user's eyes stay on the screen for 2 seconds, an instantaneous reading speed of the specific user may be "1 cut/second" or "25 words/second". As described above, the user event learning unit 212 may repeatedly collect the instantaneous reading speed and calculate the average reading speed of the specific user. The user event learning unit 212 may calculate the average reading speed of all users based on the average reading speed of the respective users and the average reading speed of the specific cartoon content based on the average reading speed of the respective users.

The calculated user event learning value may be used to correct a download speed by the preloading controller 213. Correcting of the download speed by the preloading controller 213 will now be described in detail below.

The preloading controller 213 may determine the download speed based on the data variation. The preloading controller 213 may determine that the download speed is reduced as the data variation increases. In general, as the data variation of the screen increases, an amount of computation used for the animation operation displayed on the screen, the moving operation according to the user event, and the zooming in/out operations of the screen increases. Among these operations, in a case where the cartoon data display apparatus 200 preloads cartoon content at the maximum speed, the operations may not be smoothly displayed. Thus, in a case where the data variation of the screen is large, a preloading speed may be reduced, thereby seamlessly displaying the operations.

In another embodiment, the preloading controller 213 may determine not only the download speed but also a download range of data corresponding to a preparation region based on the data variation. For example, the preloading controller 213 may determine that the download speed decreases and the download range increases as the data variation increases. As described above, the preloading controller 213 may determine that the download range increases as the data variation increases, thereby solving a problem of running out of preloaded data in a state where an operation having large data variation is repeated.

In another embodiment, the preloading controller 213 may correct the download speed based on the user event learning value calculated by the user event learning unit 212. For example, in a case where the average reading speed of the specific user is lower than the average reading speed of all users, the preloading controller 213 may correct the download speed to be slower than calculated based on the data variation with respect to the specific user. Thus, in a case of a user having a slow average reading speed, a preloading speed may be further reduced, thereby seamlessly displaying the operations. As described above, the preloading controller 213 may correct the download speed based on the user event learning value, thereby more naturally displaying the screen in accordance with a user reading habit.

In another embodiment, in a case where the data variation goes out of a preset range, the preloading controller 213 may newly determine the download range. For example, in a case where the screen moves at more than a preset speed, the preloading controller 213 may newly determine the download range in relation to a final point at which the screen is completely moved. In this case, the preloading controller 213 may determine the download range such that the data is simultaneously downloaded in a previous direction and a next direction, i.e. in both directions, in relation to the final point. As described above, in an operation in which a user passes over an intended page due to a scroll input and then reaches the intended page by performing a small scroll input in an opposite direction, the preloading controller 213 may simultaneously download content in both directions, thereby more quickly downloading the content corresponding to the intended page.

The preloading performing unit 214 downloads data corresponding to the preparation region different from the display region at the download speed determined by the preloading controller 213. In a case where the preloading controller 213 determines the download range, the preloading performing unit 214 may download the data corresponding to the preparation region as much as the download range.

Although not shown in FIG. 3, the controller 210 may further include a previously displayed region storage unit (not shown) that stores data corresponding to a previously displayed region that has been displayed as the display region for a predetermined range or a predetermined period of time.

Figure 4:
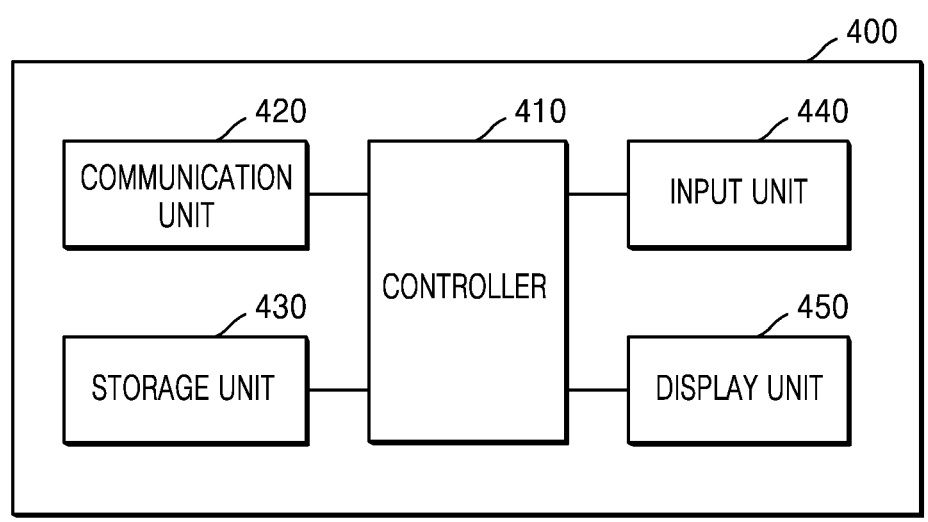
FIG. 4 is a block diagram of another example of the internal configuration of the cartoon content display apparatus of FIG. 1.

FIG. 4 is a block diagram of an exemplary embodiment of the internal configuration of the cartoon content generation apparatus 400 of FIG. 1

Referring to FIG. 4, the cartoon content generation apparatus 400 according to an exemplary embodiment includes a controller 410, a communication unit 420, a storage unit 430, an input unit 430, and a display unit 450.

The controller 410 generates one or more image files (hereinafter referred to as layers) that are input through the input unit 440 as final cartoon content in consideration of an input effect, property information of the effect, etc. The controller 410 may generate the final cartoon content such that a plurality of layers input by a user may be expressed to include the effect set by the user.

The communication unit 420 includes one or more components that enable communication between the cartoon content generation apparatus 400 and the cartoon content server 100. For example, the communication unit 420 may include a short-distance wireless communication unit or a mobile communication unit. Examples of the short-range wireless communication unit may include, but are not limited to, a Bluetooth communication unit, a Bluetooth low energy (BLE) communication unit, a near-field communication unit, a WLAN (Wi-Fi) communication unit, a Zigbee communication unit, an infrared data association (IrDA) communication unit, a Wi-Fi direct (WFD) communication unit, a ultra-wideband (UWB) communication unit, an Ant+ communication unit, etc. The mobile communication unit may exchange a radio signal with at least one among a base station, an external terminal, and a server in a mobile communication network. The radio signal may include a voice call signal, a video communication call signal, or various types of data via transmission and reception of text/multimedia messages. The communication unit 420 may communicate with the cartoon content server 100 to obtain the cartoon content or an application for displaying the cartoon content from the cartoon content server 100.

The storage unit 430 may store the cartoon content obtained through the communication unit 420.

The input unit 440 is a means used by a user to input an event or data for controlling the cartoon content generation apparatus 400. For example, the input unit 440 may include a key pad, a dome switch, a touch pad (of a contact capacitive type, a press resistive type, an infrared sensing type, a surface ultrasonic conductive type, an integration tension measurement type, or a piezo effect type), a jog wheel, a jog switch, etc. but is not limited thereto.

The input unit 440 may obtain a user input. For example, the input unit 440 may obtain a user event with respect to the cartoon content, a scroll input, a direction key input, a movable touch input having a predetermined direction.

The display unit 450 may display a user interface for generating the cartoon content. The display unit 450 may display the user event that is input through the input unit 440 and a cut and a layer added by the user according to the user interface. Meanwhile, when the display unit 450 is configured with a touch screen in which a touch pad forms a layer structure, the display unit 450 may be used as an input device in addition to an output device. The display unit 450 may include at least one of a liquid crystal display (LCD), a thin film transistor-liquid crystal display (TFT-LCD), an organic light-emitting diode (OLED) display, a flexible display, a 3D display, and an electrophoretic display.

Figure 5:
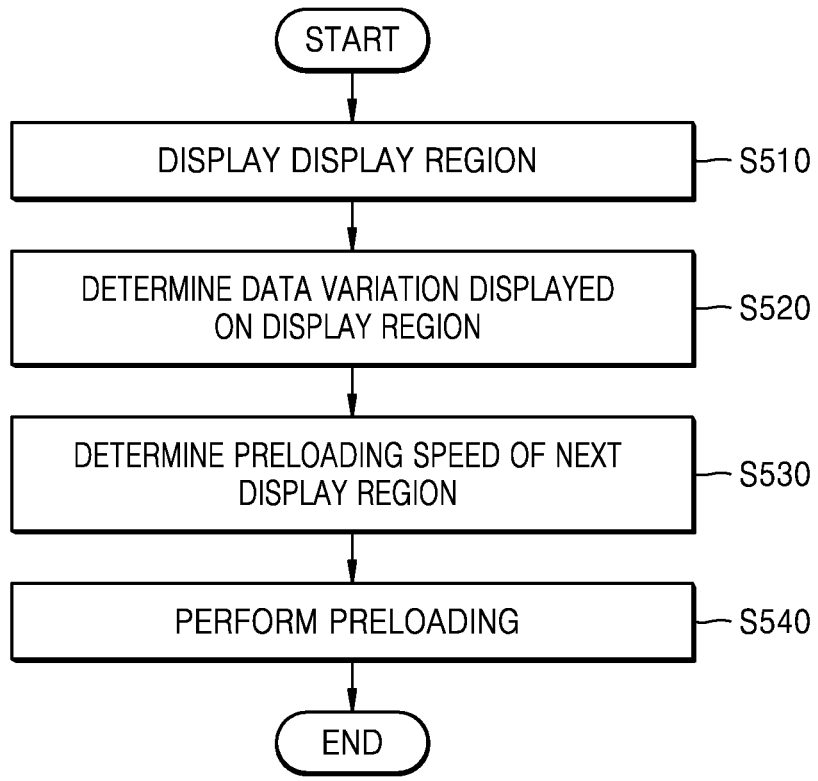
FIG. 5 is a flowchart of a cartoon content preloading method according to an exemplary embodiment.

FIG. 5 is a flowchart of a cartoon content preloading method according to an exemplary embodiment.

Referring to FIG. 5, the cartoon content preloading method according to an exemplary embodiment includes the display unit 230 of the cartoon content display apparatus 200 displaying a display region of cartoon content (S510), the display region variation determining unit 211 determining a data variation displayed on the display region (S520), the preloading controller 213 determining a preloading speed of a next display region with respect to a current display region (S530), and the preloading performing unit 214 performing preloading (S540).

When the display unit 230 displays the display region (S510), the display region variation determining unit 211 determines the data variation of the display region (S520). In S520, the display region variation determining unit 211 determines the data variation in consideration of an animation operation included in the screen or based on a change in the screen by a user event.

Thereafter, the preloading controller 213 determines a download speed based on the data variation (S530). In S530, the preloading controller 213 may determine that the download speed is reduced as the data variation increases. As described above, in a case where the data variation of the screen is large, a preloading speed may be reduced in order to seamlessly display operations.

Thereafter, the preloading performing unit 214 downloads data corresponding to a preparation region different from the display region at the download speed determined in S530 (S540).

Although not shown in FIG. 5, the cartoon content preloading method according to an exemplary embodiment may further include, before the preloading controller 213 determining the preloading speed of the next display region with respect to the current display region (S530), collecting user event history and calculating a user event learning value including an average reading speed of a user, an average reading speed of all users, an average reading speed of specific cartoon content. The preloading controller 213 may adjust the download speed by using the user event learning value in S530.

FIGS. 6A through 6D are diagrams for describing the cartoon content preloading method according to an exemplary embodiment.

FIGS. 6A through 6D illustrate a display region, a variation of the display region, a preloading speed, and a preloading region at the same time based on the cartoon content preloading method according to an exemplary embodiment.

Figure 6A:
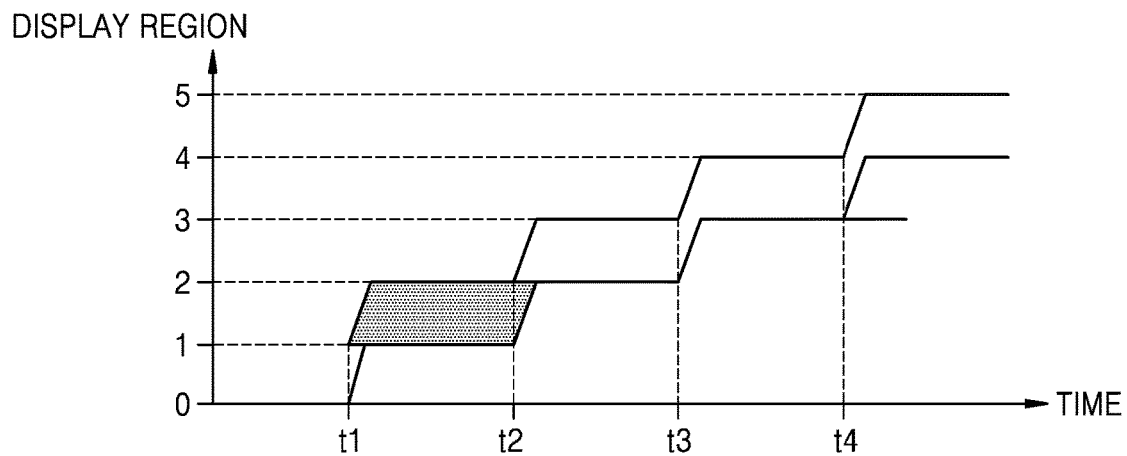
FIGS. 6A through 6D are diagrams for describing a cartoon content preloading method according to an exemplary embodiment.

As shown in FIG. 6A, the display unit 230 may display a part of cartoon content 0~5 as the display region according to a time period. For example, cartoon content 0~1 may be the display region for a time period 0~t1, cartoon content 1~2 may be the display region for a time period t1~t2, cartoon content 2~3 may be the display region for a time period t2~t3, and cartoon content 3~4 may be the display region for a time period t3~t4. The display region may be moved from the cartoon content 0~1 to the cartoon content 1~2 for a short period of time from the time t1. A change in the display region may be made by a user event, i.e., a scroll operation of a user. An animation operation may be included in the time period t1~t2 and the cartoon content 1~2 (a colored part).

In the case where the time periods t1~t4 have the same interval in FIG. 6A, the preloading controller 23 may calculate the average reading speed as "1/time period".

Figure 6B:
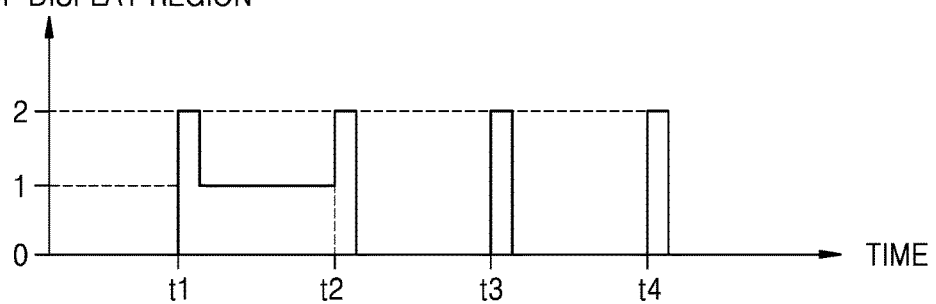

As shown in FIG. 6B, the display region variation determining unit 211 according to an exemplary embodiment may determine a variation of the display region. For example, since the cartoon content 0~1 is maintained as the display region for the time period 0~t1, the variation of the display region may be 0. Since the animation operation is included in the cartoon content 1~2 for the time period t1~t2, the variation of the display region may be 1 (a relative size). Since the display region is moved from the cartoon content 0~1 to the cartoon content 1~2 for the short period of time from the time t1, the variation of the display region may be 2 (a relative size).

Figure 6C:
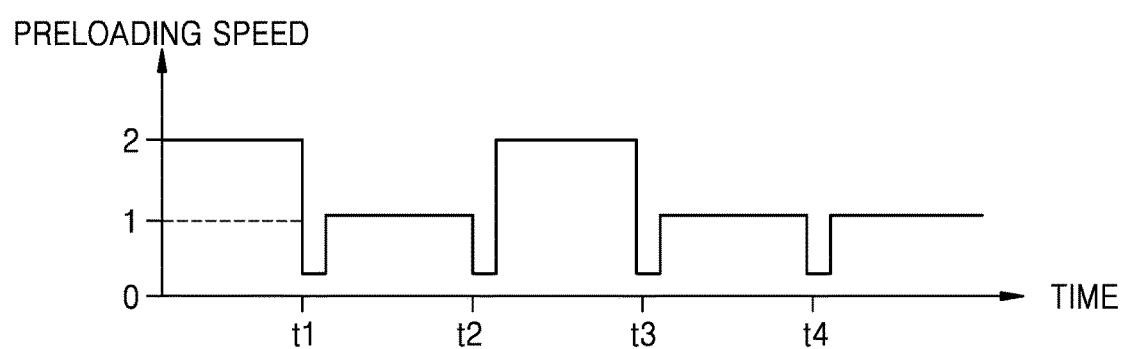

As shown in FIG. 6C, the preloading controller 213 according to an exemplary embodiment may determine that a preloading speed is reduced as the variation of the display region increases. For example, since the variation of the display region is 0 in the time period 0~t1, the preloading speed may be 2 (a relative speed), the variation of the display region is 1 in the time period t1~t2, the preloading speed may be 1 (a relative speed), and the variation of the display region is 2 for the short period of time from the time t1, the preloading speed may have a very low value (for example, 0), The preloading controller 213 may correct the preloading speed by using a user event learning value calculated by the user event leaning unit 212. For example, since the variation of the display region is 0 for the time period t3~t4, although the preloading speed must be 2, in a case where the user event leaning unit 212 calculates the average reading speed of the user as "1/time period" through the time period 0~t3, the preloading controller 213 may correct the preloading speed from 2 to 1 in consideration of the average reading speed of the user.

Figure 6D:
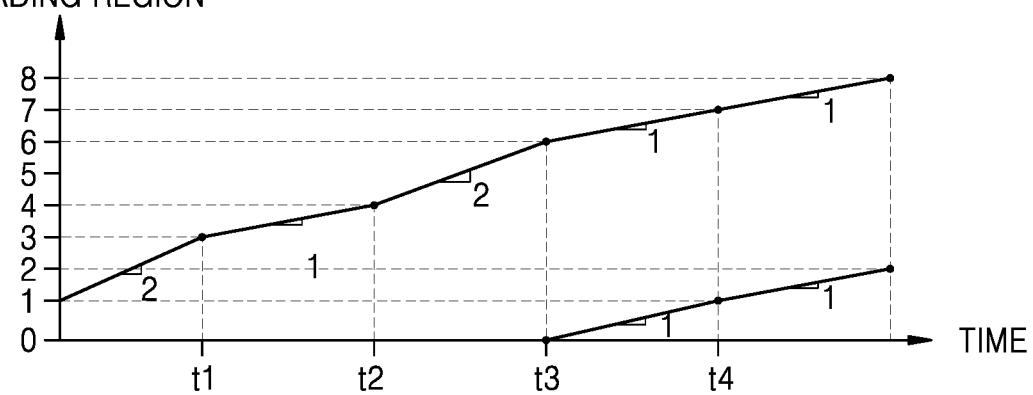

As shown in FIG. 6D, the preloading controller 213 according to an exemplary embodiment may perform preloading at the preloading speed. For example, in a case where the cartoon content 0~1 is preloaded at the time 0, since the preloading speed is 2 for the time period 0~t1, the cartoon content 1~3 may be additionally downloaded. Although the preloading speed has a very low value during the short period of time from the time t1, this is omitted in FIG. 6D.

Cartoon content corresponding to a previously display region that has been displayed as the display region by a previously display region storage unit (not shown) may also be stored in a memory for a predetermined range. For example, in a case where the previously display region storage unit stores only the previously display region within a 2 range, since the previously display region (the cartoon content 0~1) for the time period t1~t2 and the previously display region (the cartoon content 0~2) for the time period t2~t3 are within the 2 range, the previously display region storage unit stores the previously display region in the memory, whereas since the previously display region is the cartoon content 0~3 for the time period t3~t4 and exceeds the 2 range, the earliest displayed cartoon content 0~1 may be erased from the memory.

As described above, according to the one or more of the above exemplary embodiments, an apparatus, a method, and a computer program for displaying cartoon content may display the cartoon content more seamlessly by distributing a computation amount required to display the cartoon content.

According to the one or more of the above exemplary embodiments, an apparatus, a method, and a computer program for displaying cartoon content may display operations more seamlessly by reducing a speed for preloading the carton data in a case where an animation operation or an operation according to a user effect is performed.

According to the one or more of the above exemplary embodiments, an apparatus, a method, and a computer program for displaying cartoon content may more naturally display a screen in accordance with a user reading habit by correcting a speed for preloading the cartoon content based on a user event learning value.

The one or more of the above exemplary embodiments may be embodied as a computer program that can be executed in a non-transitory computer using various components. The computer program may be recorded on a computer-readable recording medium. Examples of the computer-readable recording medium may include a magnetic recording medium (a hard disc, a floppy disc, a magnetic tape, etc.), an optical recording medium (a CD-ROM, a DVD, etc.), a magneto-optical medium (e.g., a floptical disk), and a hardware device (e.g., a ROM, a RAM, a flash memory, etc.) specially designed to store and execute program commands. Furthermore, the computer-readable recording medium may be a formless medium that can be transmitted and distributed in a network, e.g., software or an application.

The computer program may be designed and configured specially for the inventive concept or would be obvious to those of ordinary skill in the field of computer software. Examples of the computer program include not only machine language codes prepared by a compiler but also high-level language codes executable by a computer using an interpreter.

The use of the terms 'a', 'an', and 'the' and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

Finally, the operations of all methods described herein can be performed in an appropriate order unless otherwise indicated herein or otherwise clearly contradicted by context. The inventive concept is not limited by an order in which the operations are described herein. The use of any and all examples, or exemplary language (e.g., "such as") provided herein, is intended merely to clearly describe the inventive concept and does not pose a limitation on the scope of the inventive concept unless otherwise claimed. Numerous modifications and adaptations will be readily apparent to those skilled in this art without departing from the spirit and scope of the inventive concept.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An apparatus for displaying content in communication with a server for providing the content, the apparatus comprising:
   a processor including a plurality of predefined functional units configured to execute a plurality of corresponding functions, the plurality of corresponding functional units including,
   a display unit configured to display a current display region of the content downloaded from the content providing server, the current display region including at least one cut having at least one layer;
   a display region variation determining unit configured to determine data variation in the current display region of the content, the data variation resulting from a predefined effect applied to at least one layer of the cut in the current display region;
   a preloading controller configured to determine a changed download speed of a next display region of the content, downloaded from the content providing server, from a download speed of the current display region of the content, based on the determined data variation in the current display region of the content; and
   a preloading performing unit configured to download, from the content providing server, the data corresponding to the next display region of the content at the changed download speed.

2. The apparatus of claim 1, wherein the preloading controller determines that the changed download speed is reduced from the download speed of the current display region as the data variation increases.

3. The apparatus of claim 2, wherein the display region variation determining unit determines the data variation in consideration of an animation operation included in the at least one layer of the cut in the current display region.

4. The apparatus of claim 3, wherein the display region variation determining unit determines that the data variation is increased as an amount of computation required for the animation operation increases.

5. The apparatus of claim 2, further comprising:
   an input unit configured to receive a user event from a user,
   wherein the display region variation determining unit determines the data variation based on a change in the current display region according to the user event.

6. The apparatus of claim 5, wherein the display region variation determining unit determines that the data variation increases as a moving speed of the current display region increases.

7. The apparatus of claim 5, wherein the display region variation determining unit determines that the data variation increases as a zooming in/out speed of the screen displaying the current display region increases.

8. The apparatus of claim 2, wherein the preloading controller further determines a download range of data corresponding to a preparation region based on the data variation, and
   wherein the preloading performing unit downloads the data corresponding to the preparation region based on the download range.

9. The apparatus of claim 5, further comprising:
   a user event learning unit configured to collect user event history and calculate a user event learning value comprising an average reading speed of the user, an average reading speed of a plurality of users, and an average reading speed with respect to the content, and
   wherein the preloading controller corrects the changed download speed by using the user event learning value.

10. The apparatus of claim 9, wherein the preloading controller controls the changed download speed by comparing the average reading speed of the user and the average reading speed of the plurality of users.

11. The apparatus of claim 9, wherein the user event learning unit calculates the average reading speed of the user in consideration of a time during which the user's eyes stay on the screen.

12. A method of preloading content performed by an apparatus for displaying the content in communication with a server for providing the content, wherein the apparatus comprises a display unit, a display region variation determining unit, a preloading controller, and a preloading performing unit, the method comprising:
   displaying a current display region of the content downloaded from the content providing server, the current display region including at least one cut having at least one layer, wherein the displaying is performed by the display unit;
   determining data variation in the current display region of the content, the data variation resulting from a predefined effect applied to at least one layer of the cut in the current display region, wherein the determining is performed by the display region variation determining unit;
   determining a change in a download speed of a next display region of the content, downloaded from the content providing server, from a download speed of the current display region of the content, based on the determined data variation in the current display region of the content, wherein the determining is performed by the preloading controller; and
   downloading, from the content providing server, the data corresponding to the next display region of the content at the changed download speed, wherein the downloading is performed by the preloading performing unit.

13. The method of claim 12, wherein the determining of the changed download speed comprises: determining that the changed download speed is reduced from the download speed of the current display region as the data variation increases, wherein the determining is performed by the preloading controller.

14. The method of claim 13, wherein the determining of the data variation comprises: determining the data variation in consideration of an animation operation included in the at least one layer of the cut in the current display region, wherein the determining is performed by the display region variation determining unit.

15. The method of claim 13, wherein the apparatus further comprises an input unit, and the method further comprises receiving a user event from a user, wherein the receiving is performed by the input unit,
   wherein the determining of the data variation comprises determining, according to the user event, the data variation based on a change in the current display region, wherein the determining is performed by the display region variation determining unit.

16. The method of claim 13, further comprising:
   determining a download range of data corresponding to a preparation region based on the data variation, wherein the determining is performed by the preloading controller, and wherein the downloading comprises downloading the data corresponding to the preparation region based on the download range, wherein the downloading is performed by the preloading performing unit.

17. The method of claim 15, wherein the apparatus further comprises a user event learning unit, and the method further comprises collecting a user event history and calculating a user event learning value comprising an average reading speed of the user, an average reading speed of a plurality of users, and an average reading speed with respect to the content, wherein the collecting is performed by the user event learning unit, and wherein the determining of the changed download speed comprises correcting the relative download speed by using the user event learning value, wherein the correcting is performed by the preloading controller.

18. The method of claim 17, wherein the determining of the changed download speed comprises controlling the relative download speed by comparing the average reading speed of the user and the average reading speed of the plurality of users, wherein the controlling is performed by the preloading controller.

19. A non-transitory computer-readable recording medium having recorded thereon a computer program for displaying content, said computer program, when executed by a computer in communication with a server for providing the content, causes the computer to perform the steps comprising:

displaying a current display region of the content downloaded from the content providing server, the current display region including at least one cut having at least one layer;

determining data variation in the current display region of the content, the data variation resulting from a predefined effect applied to at least one layer of the cut in the current display region;

determining a change in a download speed of a next display region of the content, downloaded from the content providing server, from a download speed of the current display region of the content, based on the determined data variation in the current display region of the content; and downloading, from the content providing server, the data corresponding to the next display region of the content at the changed download speed.

* * * * *